United States Patent [19]

Matsuura et al.

[11] Patent Number: 5,704,637
[45] Date of Patent: Jan. 6, 1998

[54] AIR BAG APPARATUS

[75] Inventors: Naoki Matsuura; Teruhiko Koide, both of Niwa, Japan

[73] Assignee: Kabushiki Kaisha Tokai-Rika-Denki-Seisakusho, Niwa, Japan

[21] Appl. No.: 636,923

[22] Filed: Apr. 24, 1996

[30] Foreign Application Priority Data

May 19, 1995 [JP] Japan .................. 7-121407

[51] Int. Cl.⁶ .................. B60R 21/22
[52] U.S. Cl. .................. 280/730.1; 280/730.2
[58] Field of Search .................. 280/730.2, 730.1

[56] References Cited

U.S. PATENT DOCUMENTS 533,750  7/1895  Karlow et al. .................. 280/730.2
5,348,342  9/1994  Haland et al. .................. 280/730.2

FOREIGN PATENT DOCUMENTS

WO 90/05651  5/1990  WIPO.

*Primary Examiner*—Kenneth R. Rice
*Attorney, Agent, or Firm*—Oliff & Berridge, P.L.C.

[57] ABSTRACT

An air bag apparatus provided at a seat back for a vehicle body has an inflator which has a substantially cylindrical configuration. The inflator is accommodated within a bag body which is expanded due to the gas ejected from the inflator. The inflator is disposed at the seat back such that the longitudinal direction of the inflator is directed along the height direction of the seat back. Accordingly, the air bag apparatus can be made compact in the thickness direction of the seat back.

25 Claims, 13 Drawing Sheets

F I G. 7
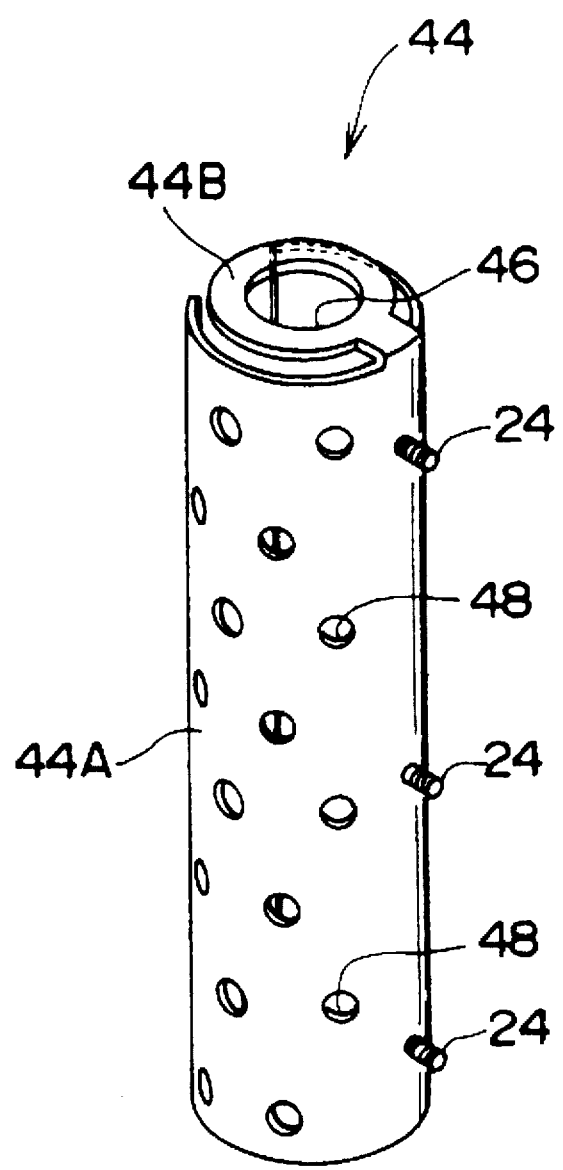

AIR BAG APPARATUS

BACKGROUND OF THE INVENTION

1. Field of the Invention

The present invention relates to an air bag apparatus in which the bag body is inflated due to a gas which is ejected from an inflator when the side portion of a vehicle body is collided.

2. Description of the Related Art

Various types of air bag apparatuses are available depending on the portions where they are disposed. For example, the description of an air bag apparatus for a collision of the side portion of a vehicle body will be given in detail hereinafter.

With reference to FIG. 12, an air bag apparatus 150 is shown schematically as an example of this type of the air bag apparatus for the collision of the side portion of a vehicle body. To be brief, the air bag apparatus 150 substantially comprises a sensor unit 156 provided at the front side portion of a seat cushion 154 of a vehicle seat 152, a body portion 160 of the air bag apparatus 150 disposed at the side of a seat back 158 of the vehicle seat 152, and a fuse line 162 which connects the sensor unit 156 and the body portion 160 to each other. When the side portion of a vehicle body is collided, the sensor unit 156 detects this state and actuates the body portion 160 of the air bag apparatus via the fuse line 162.

As shown in FIG. 13, the body portion 160 comprises a pair of gas generators 164 which are connected to the fuse line 162, a combustion chamber 166 which is connected to the gas generators 164, a bag body 168 into which the gas ejected via the combustion chamber 166 is flown, and a mount 170 for fixing the body portion 160 to the frame of the seat back 158.

However, in a case of the above-described structure, the mount 170 and the gas generators 164 largely project from the bag body 168 towards the backward portion of the seat back. For this reason, there exists a drawback in that the body portion 160 of the air bag apparatus 150 needs to be made large in the thickness direction of the seat back. In particular, in many cases, the seat back 158 has a sufficient space along the height direction thereof but not along the thickness direction thereof. Accordingly, the aforementioned air bag apparatus 150 which is made large along the thickness direction of the seat back requires some improvements.

SUMMARY OF THE INVENTION

In view of the aforementioned, it is an object of the present invention is to provide an air bag apparatus which can be made compact or small along the thickness direction of the seat back.

A first aspect of the present invention is an air bag apparatus comprising a bag body disposed at a predetermined portion of a vehicle seat in a state in which said bag body is folded, an inflator which is disposed inwardly, upwardly, or downwardly of said bag body along the height direction of the vehicle seat and which ejects a gas at the time of a collision of the side portion of a vehicle body so as to inflate said bag body along the side door of a vehicle body, and fixing means fixed to the vehicle seat for retaining said inflator and for fixing said bag body in a clamped state.

According to the first aspect of the present invention, because the inflator which ejects a gas at the time of the collision of the side portion of a vehicle body is disposed inwardly, upwardly, or downwardly of the bag body, the air bag apparatus can be made compact or small along the thickness direction of the seat back. Namely, in a case in which the inflator is placed inwardly of the bag body, the air bag apparatus can be made compact even along the height direction of the seat back.

A second aspect of the present invention is an air bag apparatus relating to the first aspect of the present invention, wherein said fixing means includes baffle means which baffles the flow of the gas ejected from one side of the inflator along the longitudinal direction thereof so as to flow the gas into the bag body.

According to the second aspect of the present invention, when the side portion of a vehicle body is collided, the gas is ejected from one side of the inflator along the longitudinal direction thereof. The baffle means baffles the ejected gas so as to flow the gas into the bag body. Here, in accordance with the second aspect of the present invention, because the fixing means relating to the first aspect of the present invention serves as baffle means, the number of the parts used for manufacturing the air bag apparatus can be reduced compared to the case in which baffle means is used separately or independently of fixing means. For this reason, an air bag apparatus can be made more compact.

BRIEF DESCRIPTION OF THE DRAWINGS

Fig. 7 is a perspective view of a retaining plate relating to a third embodiment of the present invention.

DESCRIPTION OF THE EMBODIMENT

Figure 2:
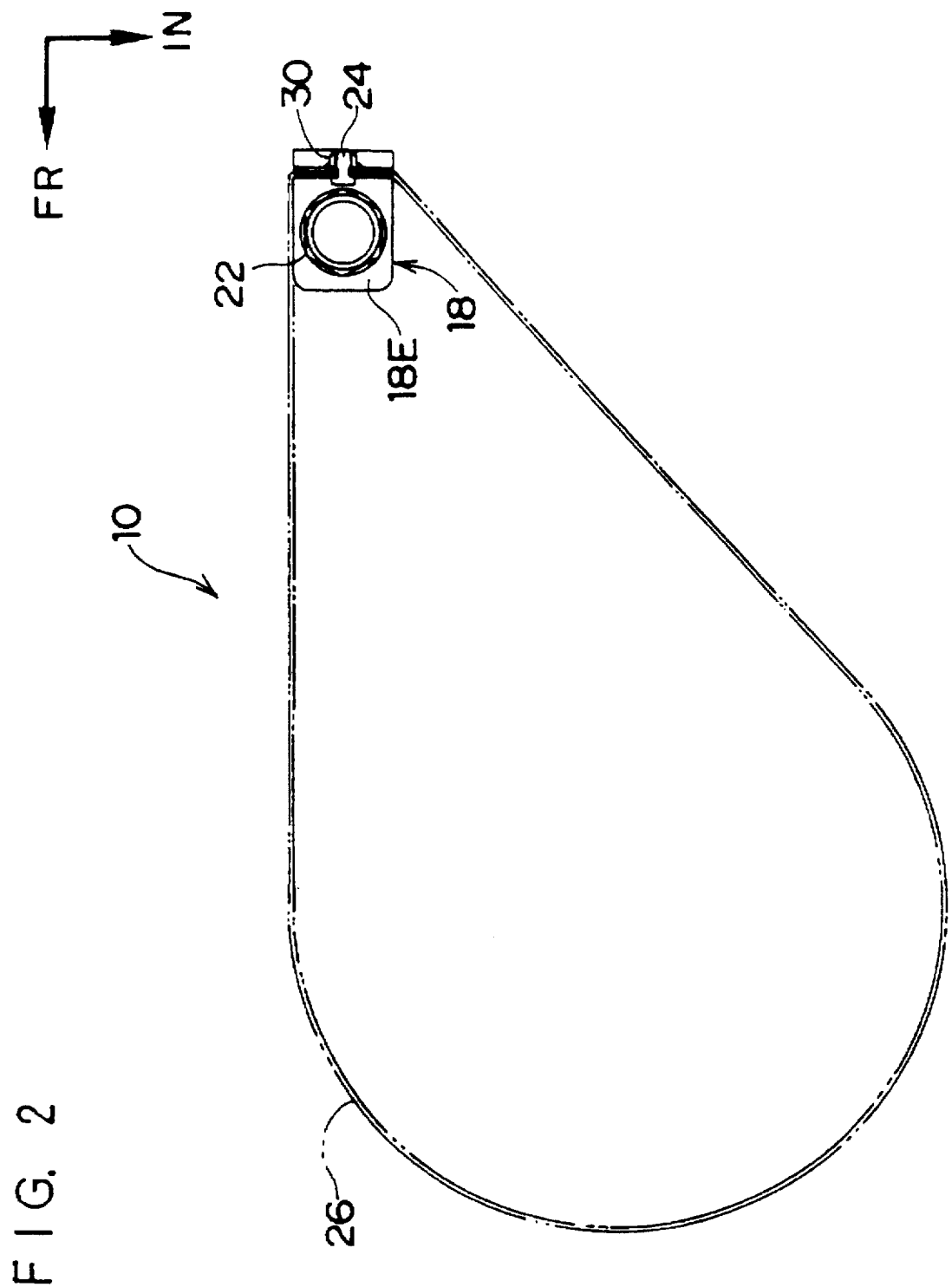
FIG. 2 is a plan view of the air bag apparatus shown in FIG. 1.
Figure 3:
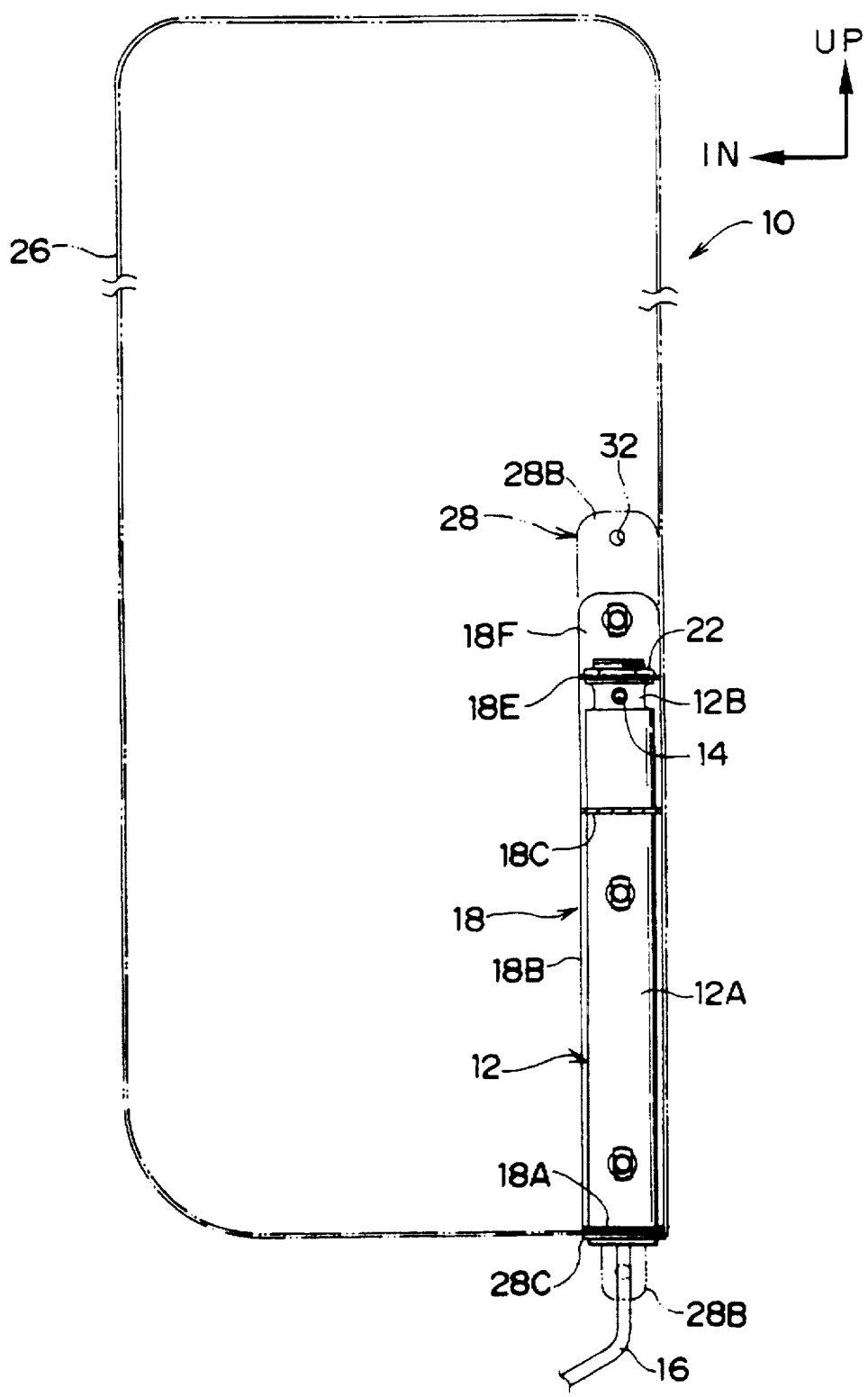
FIG. 3 is a side view in which the air bag apparatus in FIG. 1 is partly sectioned.

A first embodiment of the present invention will be described in detail hereinafter with reference to FIGS. 1 through 3.

Figure 1:
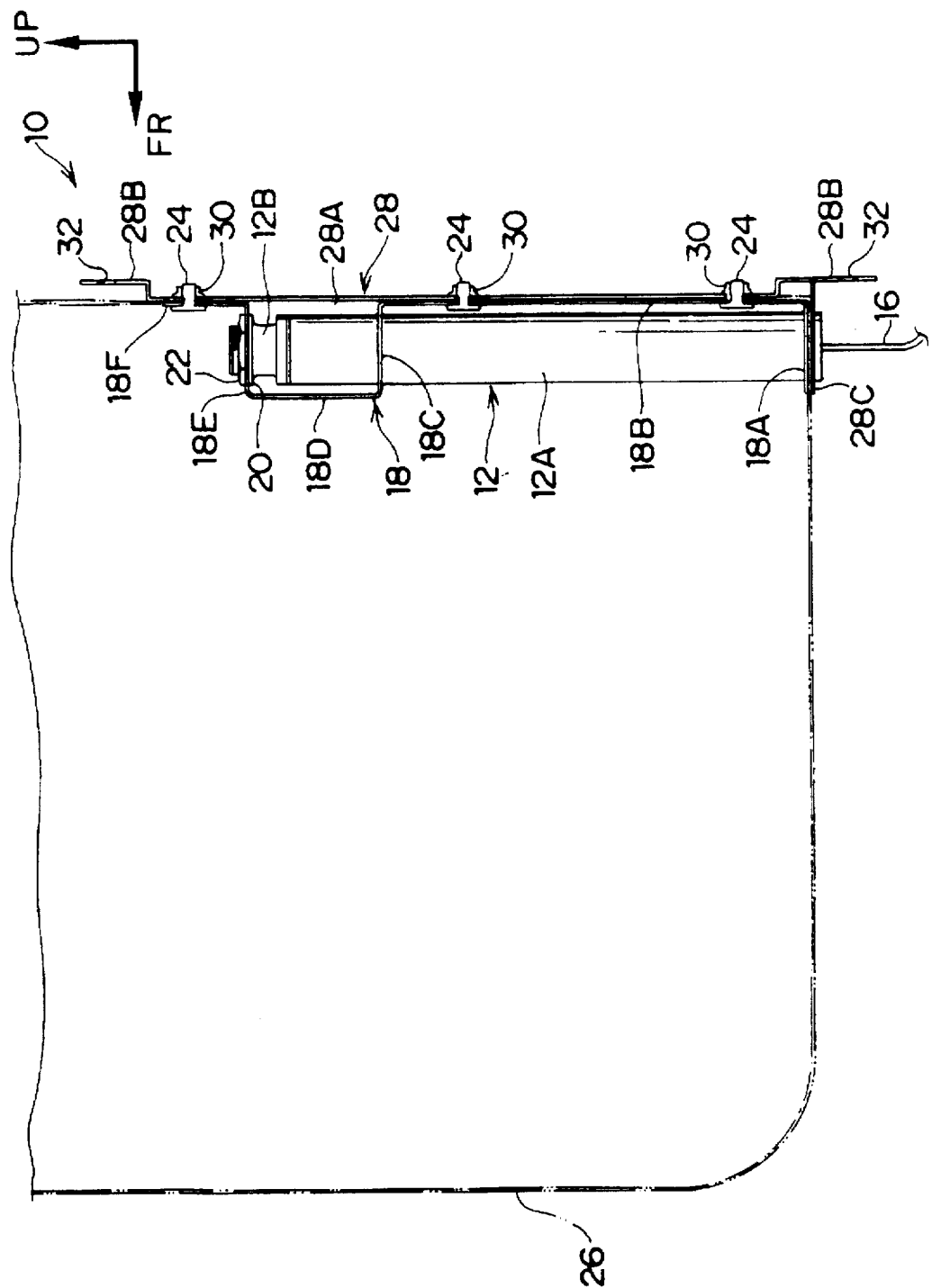
FIG. 1 is a front view of an air bag apparatus for a collision of the side portion of a vehicle body relating to a first embodiment of the present invention.

FIG. 1 is a front view of an air bag apparatus 10 at the time of the collision of the side portion of a vehicle body. FIG. 2 is a plan view of the air bag apparatus 10 shown in FIG. 1. Fig. 3 is a side view in which a part of the air bag apparatus 10 shown in FIG. 1 is cut away.

As illustrated in these figures, the air bag apparatus 10 is equipped with an inflator 12 whose configuration is substantially cylindrical. The inflator 12 comprises a body portion 12A and a gas ejecting portion 12B. The gas ejecting portion 12B whose diameter is smaller than that of the body portion 12A is provided at the upper end portion of the body portion 12A. An external thread is provided on the peripheral surface of the end portion of the gas ejecting portion 12B and a plurality of gas ejecting holes 14 (see FIG. 3) are formed so as to be spaced apart from each other at a suitable distance (e.g., at the angle of 90° or 180° ). Further, high pressure gas is sealed in the body portion 12A and a squib is also provided therein. Moreover, a lead line 16 is extended from the lower end portion of the body portion 12A. When the side portion of a vehicle body is collided, an unillustrated sensor detects this state and causes a predetermined current to be flown to the squib through the lead line 16, so that high pressure gas is therefore ejected from the gas ejecting holes 14. Further, the ignition system is not limited to an electrical ignition system of the present invention and a mechanical ignition system can be used instead of the electrical ignition system. Other than the inflator 12 in which high pressure gas is sealed therein, it is possible to use the type of an inflator in which a gas generating material is sealed and a large amount of gas is generated by the gas generating material being combusted due to the ignition of a detonator.

The above-described inflator 12 is retained by a retaining plate 18 which is formed of a narrow-width prate material bent appropriately. Moreover, the retaining plate 18 includes a bottom portion 18A provided in parallel to the lower end surface of the body portion 12A of the inflator 12, an extension portion 18B which bends from the back end portion of the bottom portion 18A and which extends upwardly so as to form a right angle from the bottom end portion 18A, a first bending portion 18C which bends from the upper end portion of the extension portion 18B in parallel to the bottom portion 18A, a baffle portion 18D which bends over a portion from the front end portion of the first bending portion 18C to a gas ejecting portion 12B in parallel to the extension portion 18B, a second bending portion 18E which bends from the upper end portion of the extension portion 18D in parallel to the first bending portion 18C, and a tip end portion 18F which bends from the back end portion of the second bending portion 18E in parallel to the baffle portion 18D.

Among these portions, the bottom portion 18A, the first bending portion 18C, and the second bending portion 18E have through holes which are formed co-axially with each other. The inflator 12 is retained in a state where it extends in the through holes. Further, a flange portion 20 is assembled with the peripheral surface of the gas ejecting portion 12B. In a state in which the flange portion 20 abuts the second bending portion 18E, a nut 22 is screwed on the above-described external thread, so that the inflator 12 is fixed to the retaining plate 18. Moreover, as for the inflator 12 according to the present embodiment, because the gas ejecting holes 14 are formed only in one side of the inflator 12 along the longitudinal direction thereof, the baffle portion 18D serves as a baffle plate in order to baffle the flow of the gas which is ejected from the gas ejecting holes 14. Further, bolts 24 are welded to the extension portion 18B and the tip end portion 18F, respectively.

The aforementioned inflator 12 and retaining plate 18 are provided in a state in which they are accommodated within a bag body 26. The bag body 26 is stored in a state where it is folded in an air bag cover which is not shown. In addition, the above-described bolts 24 project through the bag body 26.

A base plate 28 is attached to the extension portion 18B and the tip end portion 18F of the retaining plate 18 with the bag body 26 being interposed between the extension portion 18B and the tip end portion 18F of the retaining plate 18. The base plate 28 comprises a base portion 28A which is shaped in a narrow-width plate, a pair of mounting portions 28B, each of which bends from the upper and lower end portions of the base portion 28A and which extends in the direction in which they are apart from each other, and a seat portion 28C which is cut and lifted from a lower one of the mounting portions 28B and is disposed directly under the bottom portion 18A of the retaining plate 18. Formed in the base portion 28A are bolt inserting holes into which the bolts 24 are inserted. Flanged nuts 30 are screwed to the bolts 24 in a state in which the bolts 24 are inserted into these bolt inserting holes. In this way, the retaining plate 18 and the base plate 28 are assembled together. Formed respectively in the pair of the mounting portions 28B of the base plate 28 are bolt inserting holes 32 into which mounting bolts not shown are inserted. In addition, nuts are screwed to the mounting bolts such that the mounting bolts are also inserted into an unillustrated bracket fixed to the upper side portion at the side which is near the vehicle door (the bracket is fixed to the seat back frame by welding or the like). In this way, the air bag apparatus 10 is installed at the upper side of the seat back.

Next, a description of the operation of the air bag apparatus relating to the present embodiment will be given.

The above-described air bag apparatus 10 is used for the collision of the side portion of a vehicle body. In this case, when the side portion of the vehicle body is collided, a high pressure gas is ejected from the gas ejecting holes 14 of the inflator 12. The gas thus ejected strikes against the baffle portion 18D of the retaining plate 18 and change the direction in which the gas is ejected, so that the flow of the gas can be baffled. As a result, the bag body 26 inflates and presses an air bag cover which is not shown. For this reason, the air bag cover is broken from the breaking portions and is opened with the hinge portion of the air bag cover being centered. Accordingly, the bag body 26 inflates so as to be interposed between the upper body of the vehicle occupant who sits on a vehicle seat and the side door of the vehicle.

The air bag apparatus 10 which operates in the above-described manner is structured in that the inflator 12 is formed into a substantially cylindrical configuration and the inflator 12 is accommodated within the bag body 26 along the height direction of the seat back in a state in which it is retained by the retaining plate 18, so that the air bag apparatus 10 can be made compact along the thickness direction of the seat back. Accordingly, the air bag apparatus relating to the present embodiment can be sufficiently applied to a seat back for a small-sized vehicle or the like.

Further, according to the air bag apparatus of the present embodiment, because the baffle portion 18D is provided in the retaining plate 18 and serves as a diffuser, the number of the parts for assembling the air bag apparatus of the present embodiment can be reduced. As a result, it is possible to simplify the structure of the air bag apparatus and to make the air bag apparatus 10 compact or small.

Moreover, since the bag body 26 is clamped and Fixed between the extension portion 18B of the retaining plate 18 and the base portion 28A of the base plate 28, the extension portion 18B serves as a retainer or a ring place which presses the bag body 26 to the base plate 28 and fixes it thereto. Therefore, the number of the parts used for manufacturing the air bag apparatus can be reduced. Accordingly, the structure of the air bag apparatus can be simplified and the air bag apparatus can be made compact.

Namely, it should be noted that the retaining plate 18 of the present embodiment can function as a retaining body for retaining the inflator 12, as a diffuser for baffling the gas ejected from the inflator 12, and as a retainer (or a ring plate) for clamping and fixing the bag body 26 between the base plate 28 and the retainer.

Figure 4:
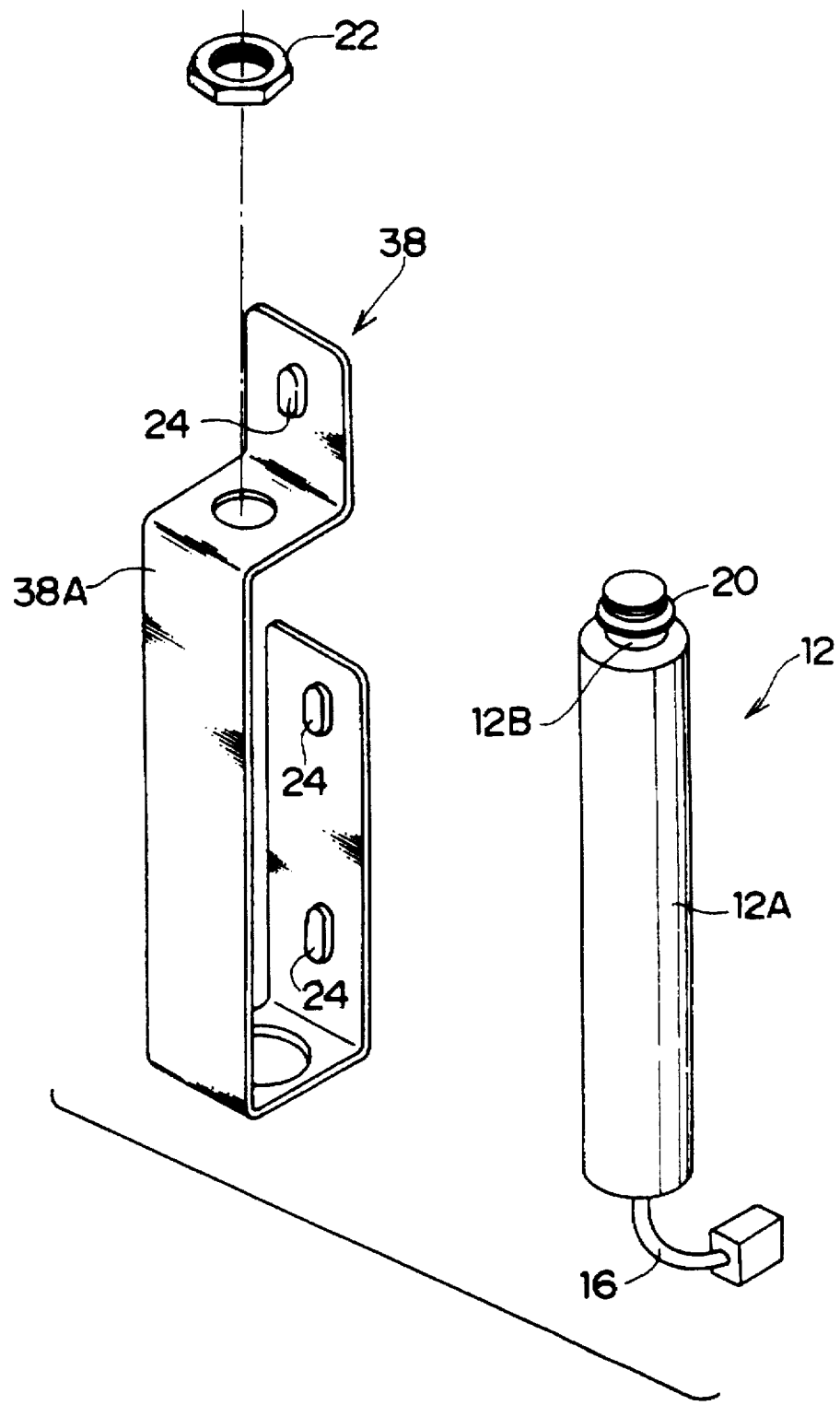
FIG. 4 is a perspective view of an inflator and a retaining plate in the air bag apparatus for a collision of the side portion of a vehicle body of the first embodiment of the present invention.
Figure 5:
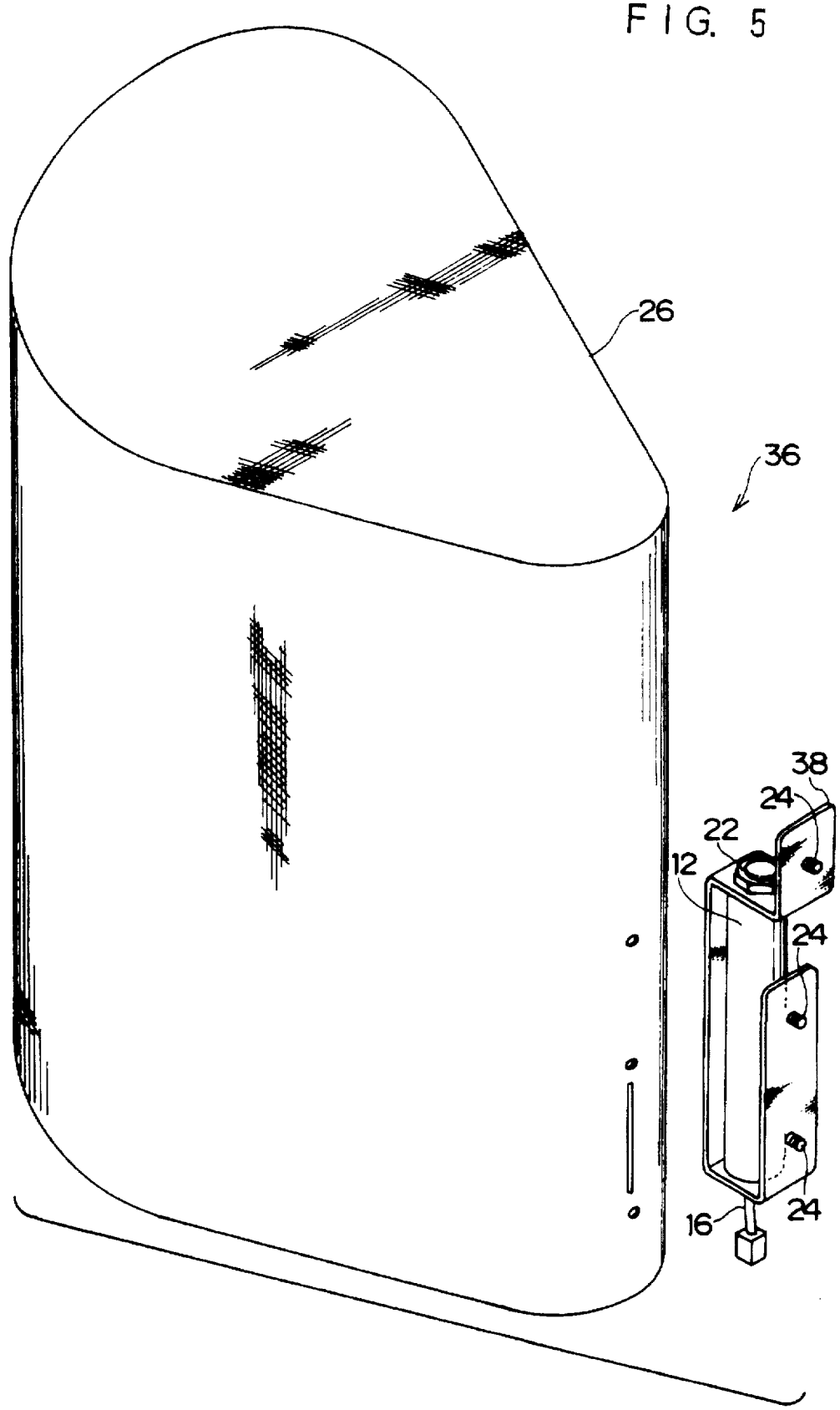
Fig. 5 is a perspective view of a state before the inflator is mounted within the bag body in the air bag apparatus shown in FIG. 4.
Figure 6:
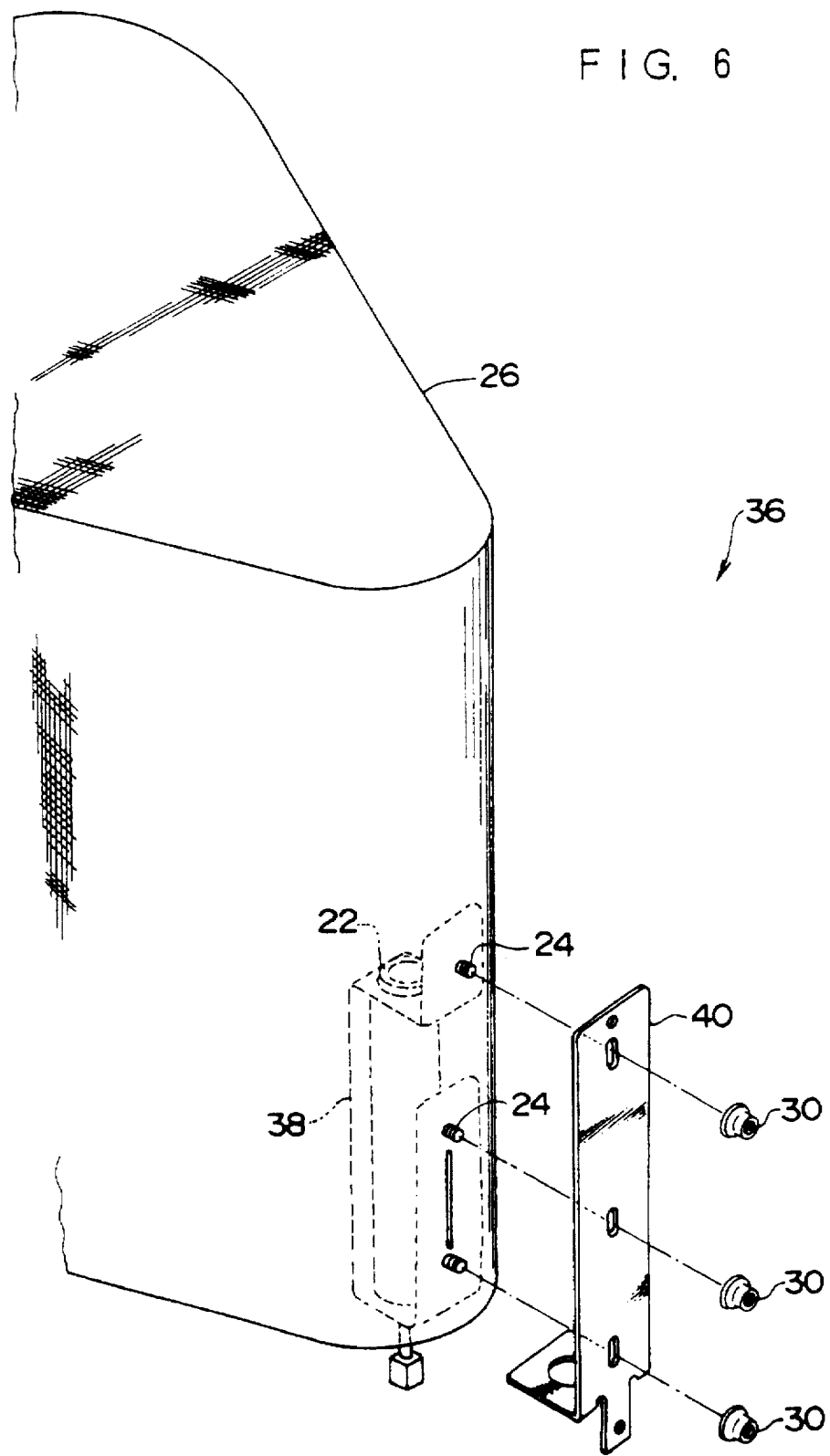
FIG. 6 is a perspective view of a state in which the inflator has been mounted within the bag body from the state shown in Fig.

A second embodiment of the present invention will be described in detail hereinafter with reference to FIGS. 4 through 6. It should be noted that the same members as those of the first embodiment will be denoted by the same reference numerals, and a description thereof will be omitted.

As illustrated in these figures, the second embodiment has the same structure as that of the first embodiment except that each configuration of a retaining plate 38 and a base plate 40 of an air bag apparatus 36 is slightly different from that of the retaining plate 18 and the base plate 28 for the air bag apparatus 10 of the first embodiment.

Because the configuration of the retaining plate 38 is generally close to a rectangle as seen from a side view, the retaining plate 38 is able to support the inflator 12 so as to cover it. Therefore, the inflator 12 can be supported steadily.

Similarly to the first embodiment, the air bag apparatus 36 of the present embodiment which is structured as described above can be made compact in the thickness direction of the seat back. Further, because a side wall 38A of the retaining plate 38 functions as the baffle portion 18D in the first embodiment, the number of the parts used for manufacturing the air bag apparatus can be reduced. Accordingly, the structure of the air bag apparatus can be simplified and the air bag apparatus can be made compact.

Further, in the second embodiment, the retaining plate 38 and the base plate 40 correspond to the "fixing means" of the present invention and the top wall 38A corresponds to the "baffle means" of the present invention.

A third embodiment of the present invention will be described hereinafter with reference to FIG. 7.

The present embodiment is characterized by the structure of a retaining plate 44. More specifically, the retaining plate 44 is provided with a base portion 44A which has a cylindrical configuration, and a pair of retaining portions 44B, each of which has a ring configuration and bends at each of both end portions of the base portion 44A along the longitudinal direction thereof. The inflator 12 is disposed in through holes 46 which are formed in the pair of retaining portions 44B. A plurality of bolts 24 project from the base portion 44A of the retaining plate 44. Further, a plurality of baffle holes 48 are formed in the base portion 44A of the retaining plate 44 so as to baffle the Flow of the gas which is ejected from the inflator 12.

Therefore, in the same manner as the first embodiment, the air bag apparatus of the third embodiment can be made compact.

Moreover, in accordance with the third embodiment, since the baffle holes 48 are equally spaced apart from each other along the longitudinal direction of the retaining plate 44, more effective baffle effect can be obtained compared to the case of the first embodiment.

In this embodiment, both the retaining plate 44 and the aforementioned base plate which is not shown correspond to the "fixing means" of the present invention and the baffle holes 48, or the retaining plate 44 correspond to the "baffle means" of the present invention.

Figure 8:
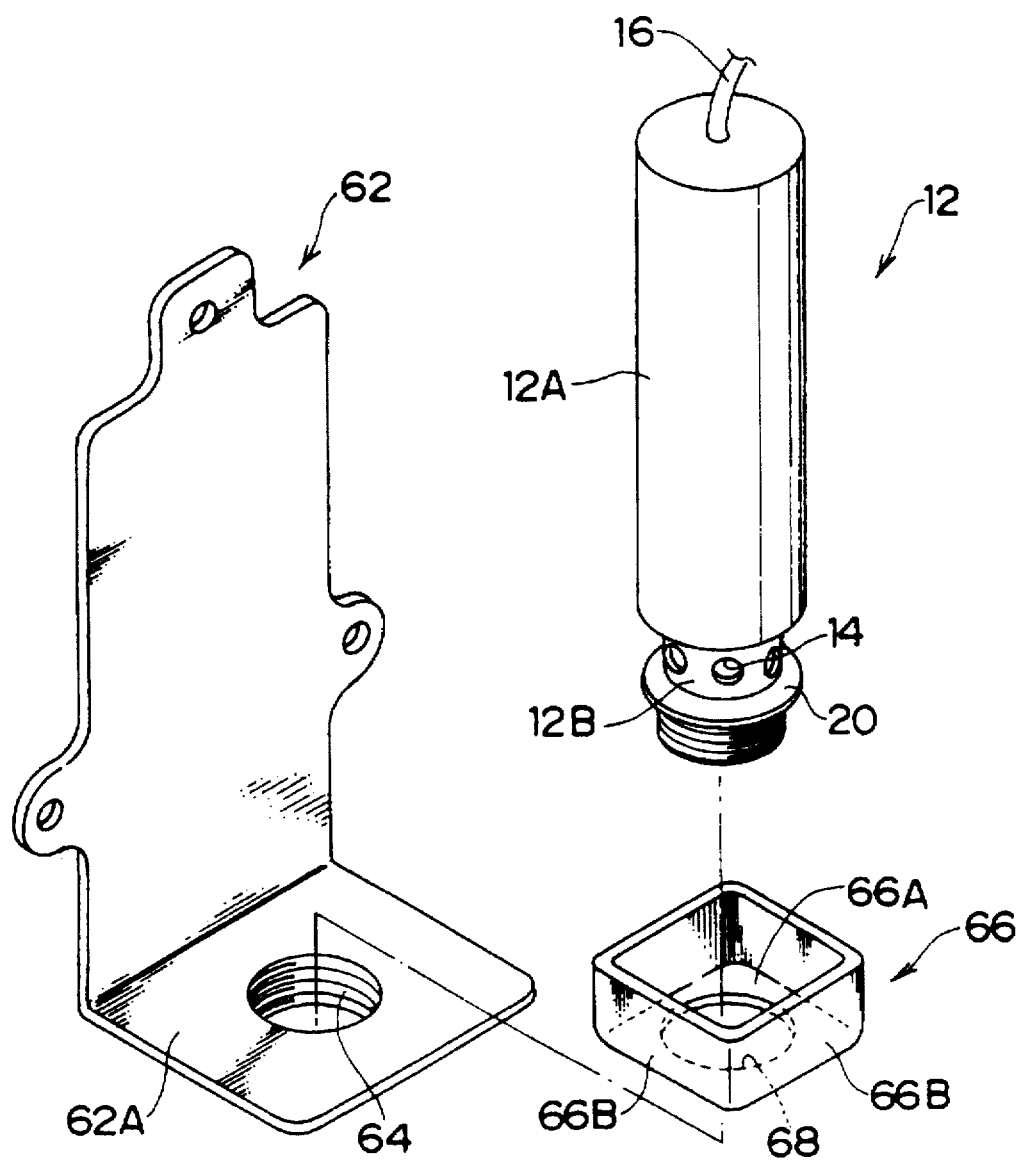
FIG. 8 is a perspective view of an inflator, a retainer, and a base plate in an air bag apparatus for a collision of the side portion of a vehicle body relating to a fourth embodiment of the present invention.
Figure 9:
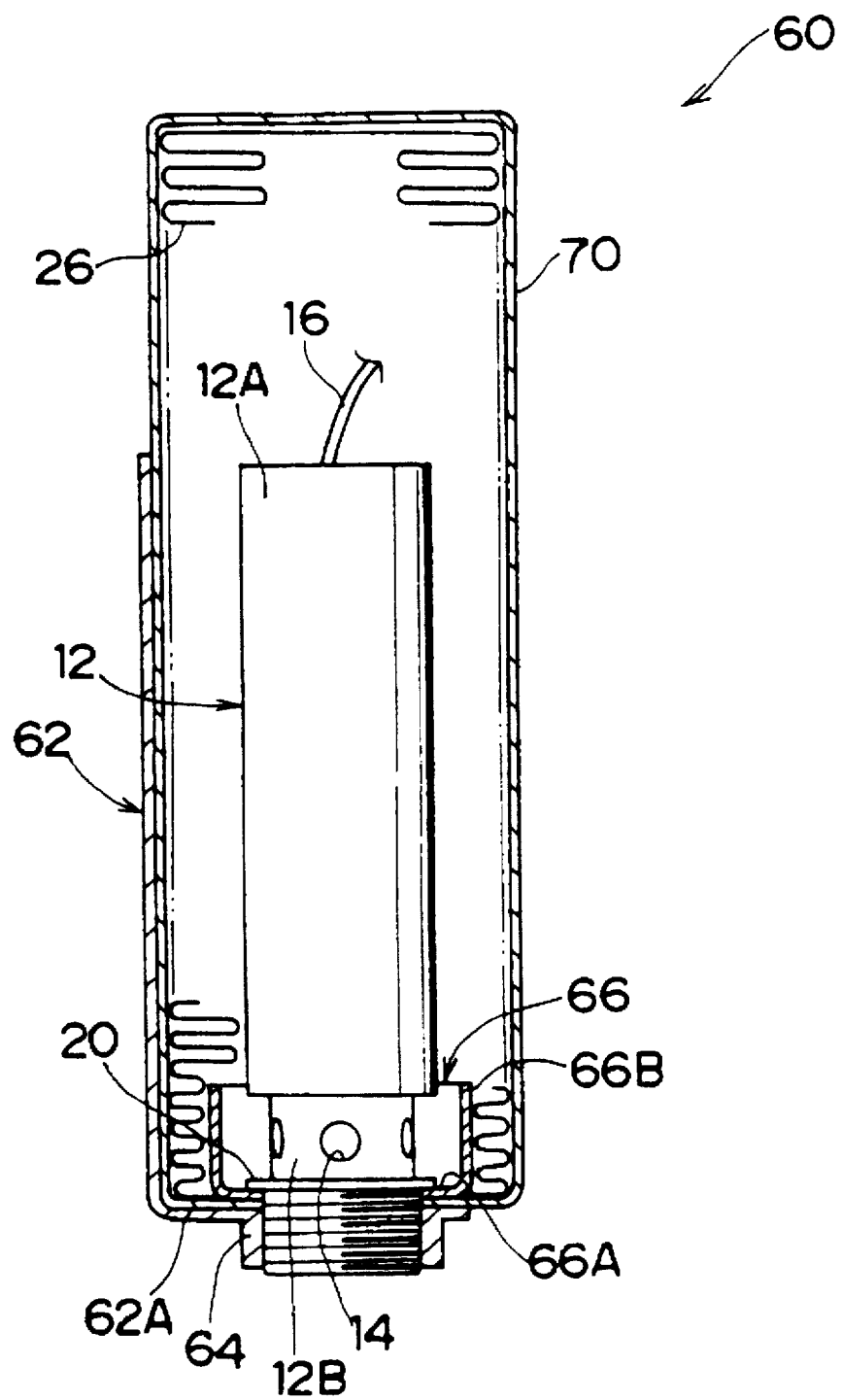
FIG. 9 is a vertical sectional view of the state in which the air bag apparatus is attached as shown in FIG. 8.

A fourth embodiment of the present invention will be described in detail hereinafter with reference to FIGS. 8 and 9. It should be noted that the same members as those of the first embodiment will be denoted by the same reference numerals, and a description thereof will be omitted.

As illustrated in these figures, an air bag apparatus 60 has a base plate 62 which has a L-shaped configuration. In the center of the bottom wall 62A of the base plate 62, an internal thread 64 is formed through burring. As described above, the external thread of the inflator 12 is screwed onto the internal thread 64 by way of a retainer 66. The retainer 66 is formed into a box-shaped configuration and looks square as seen from a plan view. The retainer 66 includes a bottom wall 66A and a peripheral wall 66B. A through hole 68 through which the external thread passes is formed in the bottom wall 66A. In a state in which the external thread of the inflator 12 and the internal thread of the base plate 62 are screwed together, a flange portion 20 of the inflator 12 presses the retainer 66 to the bottom wall 62A of the base plate 62 such that the bag body 26 and a part of an air bag cover 70 are clamped between the bottom wall 66A of the retainer 66 and the bottom wall 62A of the base plate 62. Also in this state, the body portion 12A of the inflator 12 is accommodated within the bag body 26 along the height direction of the seat back. Moreover, the air bag cover 70 is broken from the breaking portions which are not shown due to the inflation of the bag body 26 and is opened.

Since the air bag apparatus of the fourth embodiment has a structure as described above, the gas which is ejected from the gas ejecting holes 14 of the inflator 12 at the time of the collision of the side portion of the vehicle body strikes against a peripheral wall 66B of the retainer 66 and changes the direction in which the gas is ejected, so that the gas can be flown into the bag body 26 and inflate the bag body 26. Accordingly, the air bag cover 70 is broken from the breaking portions which are not shown and opened.

In the air bag apparatus 60 of the present embodiment, since the inflator 12 is formed into a substantially cylindrical configuration and is accommodated within the bag body 26 along the height direction of the seat back, the air bag apparatus 60 can be made compact in the thickness direction of the seat back of the vehicle body.

Further, because the retainer 66 serves as a diffuser, the number of the parts used for manufacturing the air bag apparatus relating to the present embodiment can be reduced. Accordingly, the structure of the air bag apparatus 60 can be simplified.

Further, according to the air bag apparatus 60 of the present embodiment, the base plate 62 and the retainer 66 correspond to the "fixing means" of the present invention and the peripheral wall 66B of the retainer 66 corresponds to the "baffle means" of the present invention.

Figure 10:
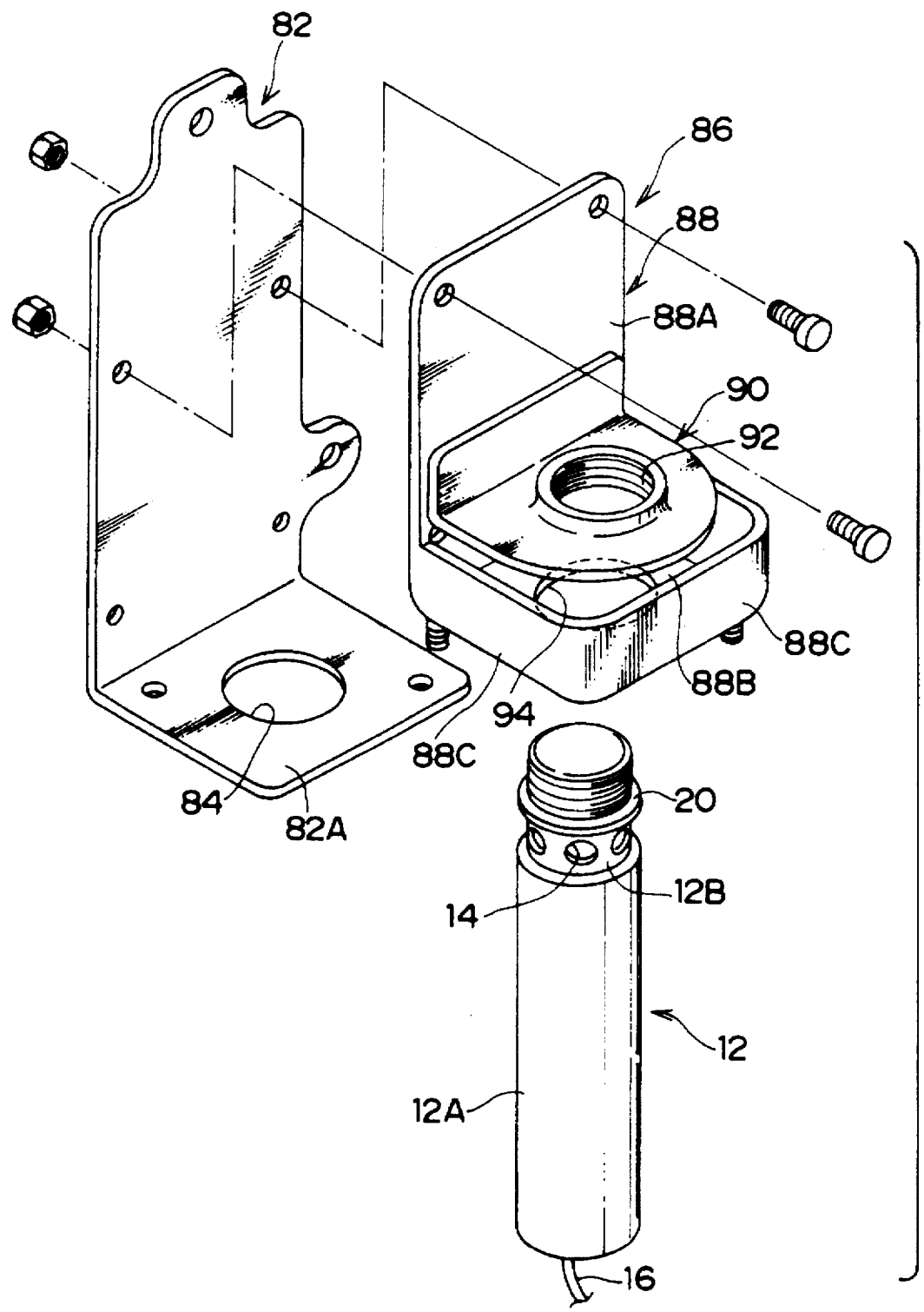
FIG. 10 is a perspective view of an inflator, a retainer assembly, and a base plate in an air bag apparatus for a collision of the side portion of a vehicle body relating to a fifth embodiment of the present invention.
Figure 11:
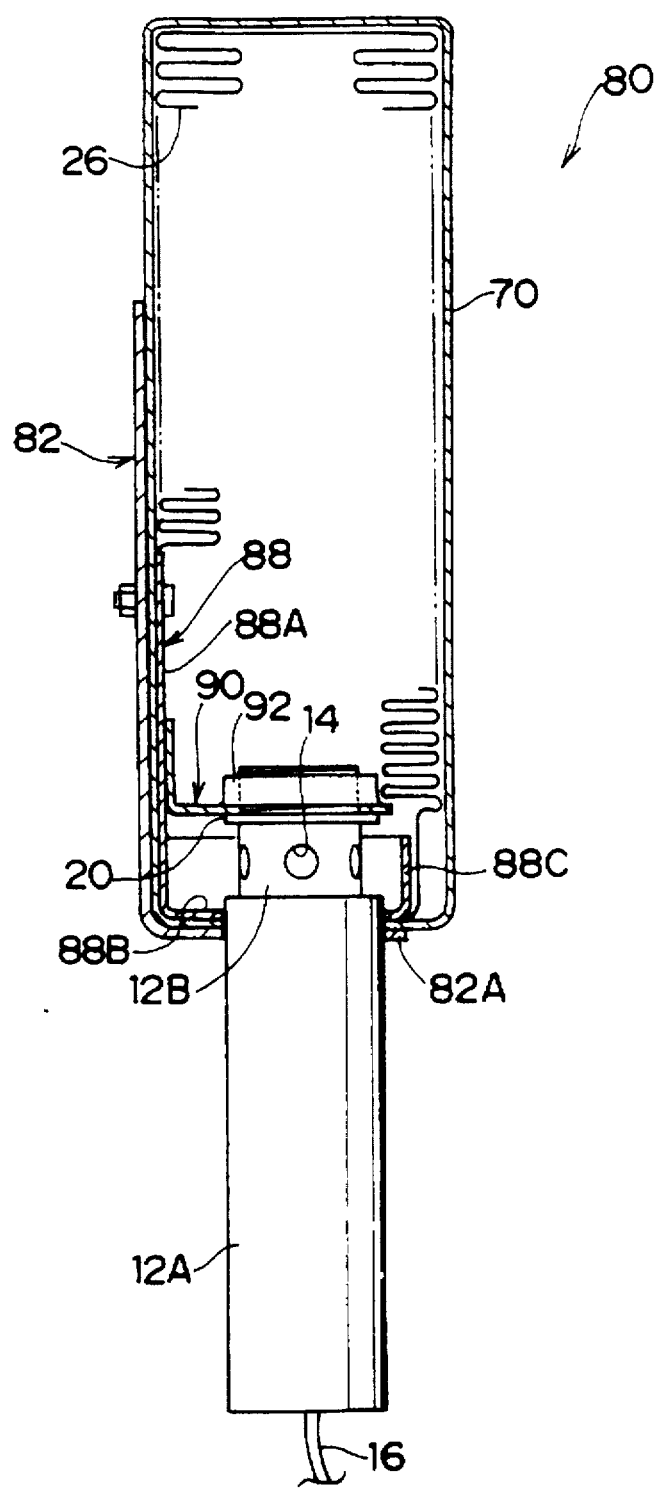
FIG. 11 is a vertical sectional view showing how the air bag apparatus is mounted as shown in FIG. 10.
Figure 12:
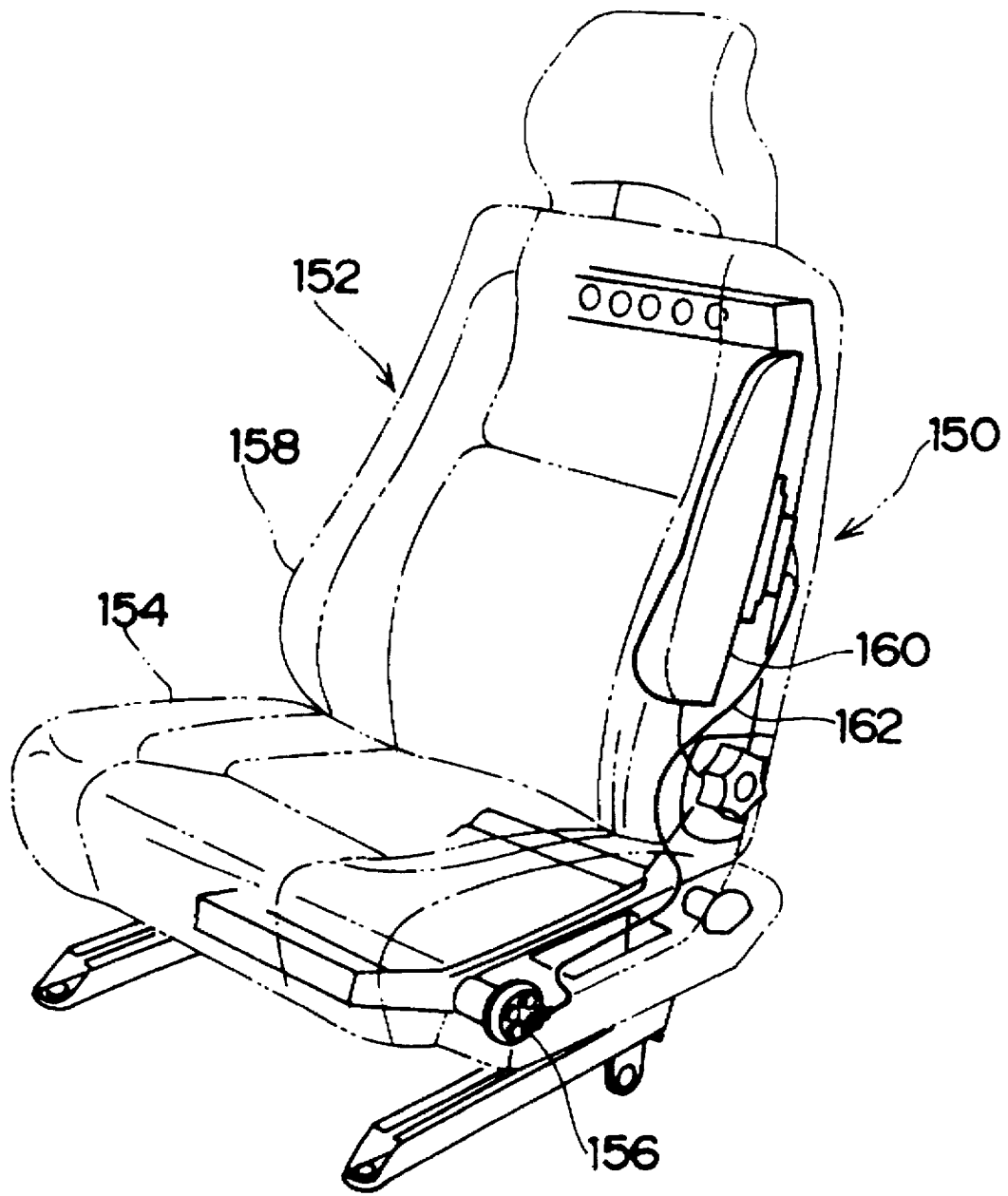
FIG. 12 is a schematically perspective view of an air bag apparatus in prior art.
Figure 13:
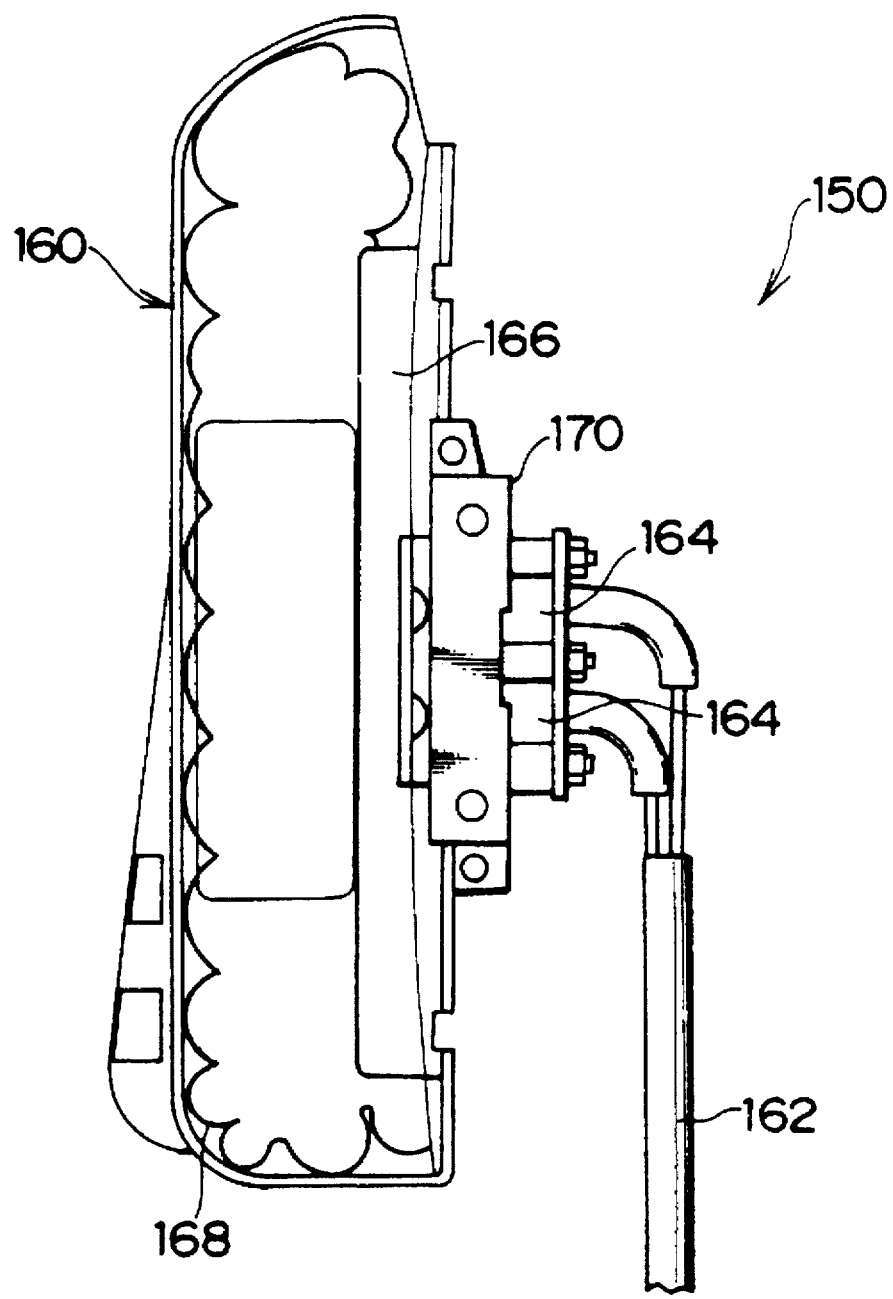
FIG. 13 is a schematic view of a body portion of the air bag apparatus shown in FIG. 12.

A fifth embodiment of the present invention will be described in detail hereinafter with reference to FIGS. 10 and 11. It should be noted that the same members as those of the fourth embodiment will be denoted by the same reference numerals, and a description thereof will be omitted.

As illustrated in these figures, with reference to an air bag apparatus 80, in a bottom wall 82A of a base plate 82, a through hole 84 is formed without an internal thread. A retainer assembly 86 is attached to the base plate 82. The retainer assembly 86 has a body portion 88 and a fixing plate 90. The body portion 88 has a bottom wall 88B and a generally square peripheral wall 88C. The square wall 88C is provided with an extension portion 88A extending upwardly as if one side wall of the above-mentioned retainer 66 is extended upwardly. The fixing plate 90 has a substantially L-shaped configuration and is fixed to an extension wall 88A by welding. An internal thread portion 92 is formed in the central portion of the fixing plate 90 through burring. Corresponding to the internal thread portion 92, a through hole 94 is formed on a bottom wall 88B of the body portion 88 coaxially with the internal thread portion 92 and the through hole 84 of the base plate 82. Further, the external thread into which the inflator 12 is inserted from the under side of the bottom wall 82A of the base plate 82 and the internal thread portion 92 of the fixing plate 90 are screwed together. For this reason, the gas ejecting portion 12B of the inflator 12 is positioned in the body portion 88 of the retainer assembly 86. However, the body portion 12A of the inflator 12 projects downwardly from the bottom wall 82A of the base plate 82.

As described above, the gas which is ejected from the gas ejecting holes 14 of the inflator 12 at the time of the collision of the side portion of the vehicle body strikes against the peripheral wall 88C and the fixing plate 90 to change the direction in which the gas is ejected, and the gas is flown into the bag body 26 so as to inflate the bag body 26. Accordingly, the air bag cover 70 is broken from the breaking portions thereof and is opened.

The air bag apparatus 80 in accordance with the above-described structure can be made compact in the thickness direction of a seat back.

Further, the retainer assembly 86 serves as a diffuser, so that the number of the parts used for manufacturing the air bag apparatus can be reduced. Namely, the structure of the air bag apparatus can be simplified.

Moreover, according to the present embodiment, because the body portion 12A of the inflator 12 projects downwardly from the bottom wall 82A of the base plate 82. A connecting portion of the lead 16 (which is a lower end portion of the inflator 12) which is formed as an ignition point of the inflator 12 is positioned relatively lower than the connecting point of the fourth embodiment, so that the distance between the ignition point of the inflator 12 and the ears of the vehicle occupant can be lengthened.

Further, in accordance with the above-described embodiment, the base plate 82 and the retainer assembly 86 correspond to the "fixing means" of the present invention and the peripheral wall 88C and the fixing plate 90 of the retainer assembly 86 correspond to the "baffle means" of the present invention.

In accordance with the aforementioned embodiments of the present invention, the inflator 12 is disposed at the inward or downward portion of the bag body 26 along the height direction of a vehicle seat. However, the inflator 12 may be positioned at an upward portion of the bag body 26.

What is claimed is:

1. An air bag apparatus, comprising:
    a bag body which is provided at a predetermined portion of a vehicle seat in a state in which said bag body is folded;
    an inflator which is disposed along the height direction of the vehicle seat, said inflator ejecting a gas when the side portion of a vehicle body is collided so as to inflate said bag body along a side door of a vehicle body; and
    fixing means which is fixed to the vehicle seat, said fixing means retaining said inflator and fixing said bag body in a clamped state.

2. An air bag apparatus according to claim 1, wherein said fixing means serves as baffle means which baffles the flow of the gas ejected from one side of said inflator along a longitudinal direction thereof so as to flow the gas into the bag body.

3. An air bag apparatus according to claim 1, wherein said fixing means includes a retaining member which retains said inflator and a base member which supports said inflator to a frame of said vehicle seat through said retaining member.

4. An air bag apparatus according to claim 3, wherein said bag body is clamped and fixed between said retaining member and said base member.

5. An air bag apparatus according to claim 4, wherein said inflator is formed into an elongated cylindrical configuration, a gas ejecting portion ejecting a gas is provided at one end portion off said inflator along the longitudinal direction thereof, and said longitudinal direction of said inflator is directed along the height direction of said vehicle seat.

6. An air bag apparatus according to claim 3, wherein baffle means is provided in said retaining means.

7. An air bag apparatus according to claim 5, wherein said inflator is disposed at the seat back of said vehicle seat.

8. An air bag apparatus, comprising;
    a bag body which is provided at a predetermined portion of a vehicle seat in a state in which said bag body is folded;
    an inflator which is formed into a substantially cylindrical configuration, at least one portion of said inflator being positioned inwardly of said bag body, the longitudinal direction of said inflator being directed along the height direction of the vehicle seat, and said inflator ejecting a gas at the time of a collision of the side portion of a vehicle body so as to inflate said bag body along the side door of the vehicle body; and
    fixing means which is fixed to said vehicle seat, said fixing means retaining said inflator and fixing said bag body in a clamped state.

9. An air bag apparatus according to claim 8, wherein said fixing means includes baffle means which baffles the flow of the gas ejected from one side of said inflator along the longitudinal direction thereof so as to flow the gas into said bag body.

10. An air bag apparatus according to claim 8, wherein said at least one portion of said inflator is a gas ejecting portion which is provided at one end portion of the longitudinal direction of said inflator in order to eject said gas.

11. An air bag apparatus according to claim 10, wherein said fixing means includes retaining means which retains said inflator and a base plate which supports said inflator to a frame of said vehicle seat.

12. An air bag apparatus according to claim 11, wherein said bag body is clamped and fixed between said retaining means and said base plate.

13. An air bag apparatus according to claim 12, wherein said baffle means is provided in said retaining means.

14. An air bag apparatus according to claim 13, wherein said retaining means is a retaining plate and said baffle means is a portion which opposes said gas ejecting portion forming a part of said retaining plate.

15. An air bag apparatus according to claim 14, wherein said retaining plate includes a first portion which extends in a transverse direction of said inflator and includes a hole into which said inflator is inserted, and said inflator is fixed to said first portion.

16. An air bag apparatus according to claim 8, wherein said inflator has an external thread portion; and said fixing means has an infernal thread portion on which said external thread portion is screwed so as to fix said inflator.

17. An air bag apparatus according to claim 8, wherein said inflator is entirely disposed within said bag body.

18. An air bag apparatus according to claim 13, wherein said baffle means includes at least one baffle hole through which the gas ejected from said inflator passes.

19. An air bag apparatus according to claim 8, wherein said bag body and said inflator are disposed at the seat back of said vehicle seat.

20. An air bag apparatus according to claim 10, wherein said gas ejecting portion is positioned inside said inflator and said inflator is positioned following to said bag body from the top to the bottom of the seat back along the height direction thereof.

21. An air bag apparatus, comprising:

an air bag;

an inflator having a gas ejecting portion for injecting gas into the air bag to inflate the air bag, at least a portion of the inflator, including the gas ejecting portion, disposed within the air bag; and a support for holding the inflator relative to the air bag, the support including a baffle having a solid wall facing the gas ejecting portion of the inflator for deflecting gas exiting the gas ejecting portion.

22. The apparatus of claim 21, wherein the baffle includes a substantially cup-shaped member surrounding the gas ejecting portion of the inflator.

23. The apparatus of claim 21, wherein the inflator is substantially cylindrical, the gas ejecting portion being disposed proximate one end of the inflator.

24. The apparatus of claim 23, wherein the support extends along the length of the inflator and is adapted to engage at least one end of the inflator, the baffle comprising a substantially planar portion of the support.

25. The apparatus of claim 21, further comprising a member external of the air bag and adapted to be connected to the portion of the support within the air bag for fixing the support and air bag to a selected position in a vehicle.

* * * * *